Dec. 21, 1965  T. L. BLOSE ETAL  3,224,799
THREADED TUBE JOINT HAVING A METAL-TO-METAL SEAL
Filed June 21, 1965  2 Sheets-Sheet 1

INVENTORS
Thomas L. Blose and
Henry J. Beckert,
BY

ATTORNEYS.

Dec. 21, 1965  T. L. BLOSE ETAL  3,224,799
THREADED TUBE JOINT HAVING A METAL-TO-METAL SEAL
Filed June 21, 1965  2 Sheets-Sheet 2

INVENTORS
THOMAS L. BLOSE AND
HENRY J. BECKERT,
BY

ATTORNEYS.

3,224,799
THREADED TUBE JOINT HAVING A
METAL-TO-METAL SEAL
Thomas L. Blose, Bradfordwoods, and Henry J. Beckert, Rochester, Pa., assignors to Armco Steel Corporation, Middletown, Ohio, a corporation of Ohio
Filed June 21, 1965, Ser. No. 470,310
6 Claims. (Cl. 285—334)

This is a continuation-in-part of copending application Serial No. 205,310 filed June 26, 1962 and entitled, Tubing Joint, and now abandoned.

This invention relates to threaded connections for tubular products such as are extensively use in the oil and gas industry in connection with the exploitation of subsurface deposits of natural resources such as oil and gas. While in the following description and in the claims reference will be made to tubing, it should be understood that the term tubing is intended to be inclusive of what is known as casing.

The conditions under which tubing is used and the requirements of such tubing have undergone continuous changes through the years. When it is borne in mind that the original oil and gas wells went only to a depth of a few hundred feet and that wells currently being driven both for exploration and production have extended to a depth in excess of twenty thousand feet, it will be realized that great changes have come about in the physical and mechanical requirements of the tubing and consequently in the requirements for a tubing connection or joint.

The type of thread employed in tubular products has varied through the years and many new types of joints have been proposed and actually used.

The loads which the threads in the tubing joint or connections have been required to carry have, of course, increased tremendously. It will be understood that in a twenty thousand foot string of tubing the uppermost tubing joint of the string must withstand the weight load of twenty thousand feed of tubing even when no work is being done, and the tubing is simply suspended. Since the ordinary tubing commonly used today will weigh from four pounds to in excess of twelve pounds per foot, the tremendous loads carried by the threads will be appreciated. If the tubing is also used for drilling purposes, the coupling must be able to withstand high torque loads in addition to the tensile load.

One difficulty encountered with tubing is that when the joint is subjected to a high axial tension load the normal tendency of the threaded element of the pipe is to reduce somewhat in diameter both in the elastic as well as in the plastic range. When this reduction in diameter takes place the threaded elements may become disengaged and bring about what is known as pull-out or unzippering.

So far as the tubing joint is concerned it must, of course, be leak-proof and this means that a seal of some sort must be provided. The tubing joint must be capable of being made up and disassembled numerous times without galling and without the danger of stripping threads or cross-threading. It is, of course, desirable that the joint may be "stabbed" and that thereafter it can be made up with a relatively small number of turns.

In recent years, it has become common to use an integral or upset joint wherein the threaded portion of the pipe is thickened by a forging technique so as to provide more metal in the area where threads are cut. The present invention may be used with an integral or upset type of joint; it is particularly advantageous, however, with a threaded and coupled joint wherein both ends of the pipe are provided with male joining elements, and a coupling member is provided with cooperating female joining elements, and it will be so described hereinafter.

With the various foregoing considerations in mind, it is an object of the present invention to provide a tubing joint which will make a tight seal and will make such a seal even with various degrees of make-up.

Another object of the invention resides in the provision of a joint having 100% efficiency, which may be defined as a joint which, in the great majority of cases, will not fail under a tensile load before the body of the tubing or pipe held together by the joint.

An ancillary object in connection with achieving 100% efficiency involves the provision of threads having a negative back flank angle or pulling flank angle thereby preventing the danger of unzippering.

It is another object of the invention to provide a joint having a metal-to-metal seal which has excellent antigalling characteristics.

It is another object of the invention to provide a joint which can be made up with relatively few axial turns after stabbing and wherein the threads are so designed that cross-threading is substantially eliminated.

A further object of the invention is the provision of means for safeguarding the joint against damage which may be caused by excessive make-up in field assembly, and to prevent excessive make-up by torque applied to the tubing in drilling operations.

These and other objects of the invention, which will be pointed out in more detail hereinafter or which will become apparent to one skilled in the art upon reading these specifications, are accomplished by that certain construction and arrangement of parts of which the following describes certain exemplary embodiments.

Reference is made to the drawings forming a part hereof and in which.

Briefly, in the practice of the invention, there is provided a female member having internal tapered threads coacting with tapered threads on the male end. In order to permit deeper stabbing and therefore more rapid make-up, the taper of the pitch line of the thread is steeper than usual. The threads also have a lower profile and the pitch of the threads is longer than usual whereby the joint may be made up rapidly after full stabbing. The pulling flank or back flank of the threads has a negative angle whereas the front flank has a relatively easy angle, usually about 45°. Conical sealing surfaces are provided both on the female member and on the male member, which surfaces are complementary and tapered parallel to the taper of the threads. These conical surfaces are provided with a surface finish which will be described in greater detail hereinafter, which makes a most effective seal which can be disassembled and made up again numerous times without galling and without deterioration in sealing qualities.

Figure 1:
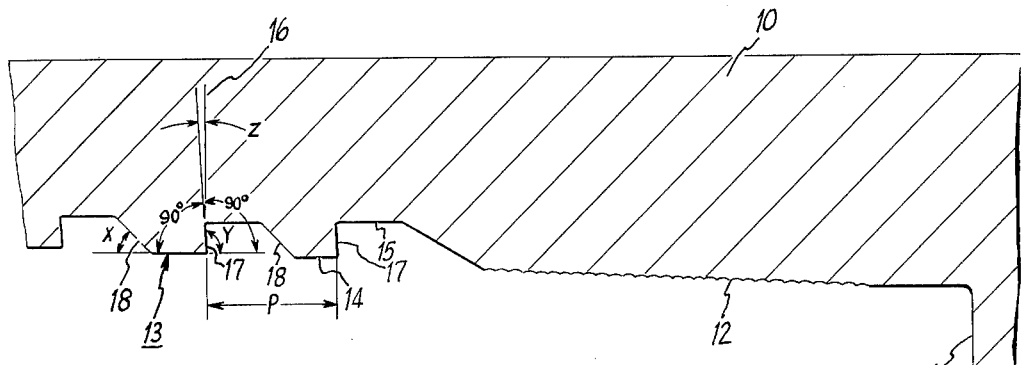
FIGURE 1 is a fragmentary, greatly enlarged cross-sectional view of the female element of the joint, showing details of the thread profile and showing the sealing surface and stop shoulder.

Referring now in more detail to the drawings, a fragment of a female member is shown in FIGURE 1, the female member being indicated generally at 10. The female member is provided with a stop shoulder at 11, and a sealing surface 12.

The threads shown at the left of the figure are of a specially contoured type and are indicated generally by the numeral 13. The characteristics of the threads are as follows. The crests 14 and roots 15 are parallel to the axis of the joint to prevent cross-threading, and it will be clear from the figure that the teeth have a relative low profile. The line 16 indicates a right angle with respect to the axis of the joint and it will be seen that the pulling flank or back flank 17 has a negative angle indicated at Z. Stated another way, the angle Y between the axis of the joint and the pulling flank is greater than 90°. This negative back flank angle results in making the grip of the threads more positive when the joint is subjected to tension, as distinguished from the radial sliding action when threads with a zero or a positive back flank angle are subjected to tension, and which results in unzipping.

Figure 2:
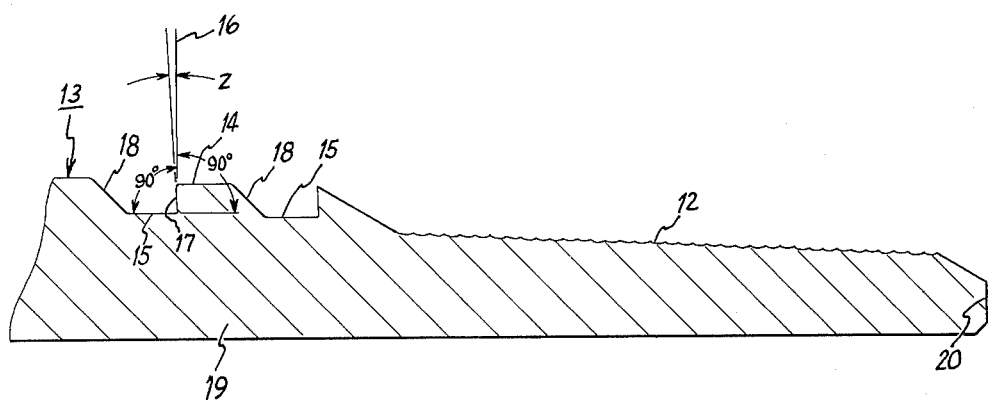
FIGURE 2 is a view similar to FIGURE 1 of the male end.

The front flank 18 preferably makes an angle of approximately 45° with the axis of the pipe as indicated by the angle X. This angle is not critical, and may vary from about 30° to about 60°, depending upon the diameter of the pipe and its intended use, with maximum stabbing ease occurring in the middle of the range. It will be understood that the reference numerals referring to the threads will be used both on the female and on the male end since the threads are substantially identical. In FIGURE 2 the male end portion is indicated at 19 and its end face is indicated at 20. As will be clear from a consideration of FIGURES 3 and 4, the threads are narrower than the thread grooves.

Figure 3:
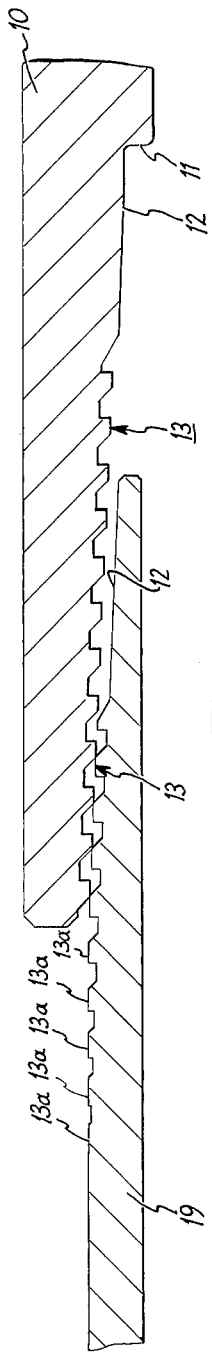
FIGURE 3 is a fragmentary cross-sectional view showing the male and female elements of the joint in the position they occupy when the joint is stabbed.
Figure 4:
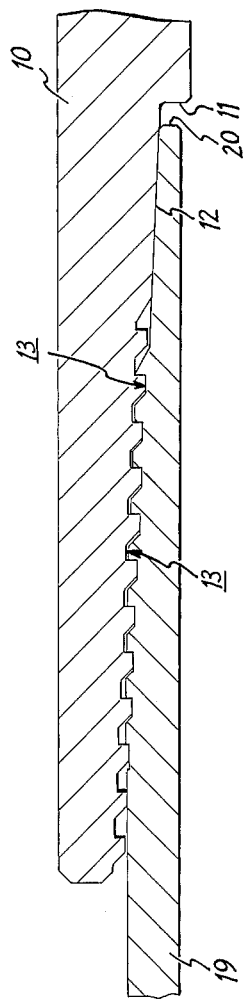
FIGURE 4 is a view similar to FIGURE 3 showing the joint fully made up and tonged.

From a consideration of FIGURES 3 and 4, it will be understood that the threads are disposed on a taper and that the female member is provided with fully cut threads throughout the entire threaded portion. The male end is provided with similar threads, but these threads gradually diminish in depth as the large diameter end of the thread is approached. This results from the continuation of the male thread roots on the taper helix path established in the full threaded portion until said thread roots reach the outer surface of the male tubular member. The portion of the thread length which becomes progressively shallower in depth is called the vanishing thread or, alternatively, the run-out thread, as indicated at 13a.

In order to make for deep stabbing and quick make-up, the preferred taper of the threads 13 is about 1 inch per foot on the diameter. This taper is greater than that conventionally used in the industry. In manufacture it is difficult, if not impossible, to make the tapers on the male and female members exactly the same. Therefore, to insure contact between the female thread crests and male thread roots, in the vanishing portion of the pipe threads the tolerances on the taper for male and female threads should be such that the actual taper of the male threads will tend to be slightly steeper than that of the female threads.

Similarly the pitch of the threads is longer than conventionally used and the preferred pitch P is six threads per inch. With the taper and pitch described, the joint can be hand-tightened in from about 4½ to about 5½ turns and power tightened or tonged with an additional 1 to 1½ turns.

The term profile as used herein, refers to the ratio of one-half the thread pitch to the height of the thread, the latter being the radial measurement between the major and minor thread cones. The thread of this invention has a low profile, by which is meant that the foregoing ratio is at least about two.

The female member 10 and the male end 19 are both provided with conical sealing surfaces heretofore referred to and designated by the numeral 12 in FIGURES 1 to 4 inclusive. These surfaces are disposed on a taper parallel to the taper of the threads as described above, and by a consideration of FIGURE 3 it will be seen that the surface 12 is inwardly offset from the crests of the threads 13 on the female member so that the sealing surfaces 12 on the female member and on the male come into contact before contact occurs between the female thread crests and the male thread roots in the threaded portion. The purpose is to insure a leak-tight mating at the seal surfaces even though the make-up of the joint is somewhat less than the full intended amount. The cooperating surfaces 12 are so arranged in relation to the thread 13 that when the joint is fully made up and tonged for the first time as shown in FIGURE 4, the end 20 of the male member 19 will still be roughly one pitch length away from the stop shoulder 11 in the female member. This distance may vary from about one-tenth to about two-tenths of an inch. The stop shoulder 11 serves to prevent damage to the joint by excessive make-up. Also, when the tubing is used in drilling, the shoulder limits additional make-up, which might result from the torque applied in drilling, to a non-damaging amount.

Figure 5:
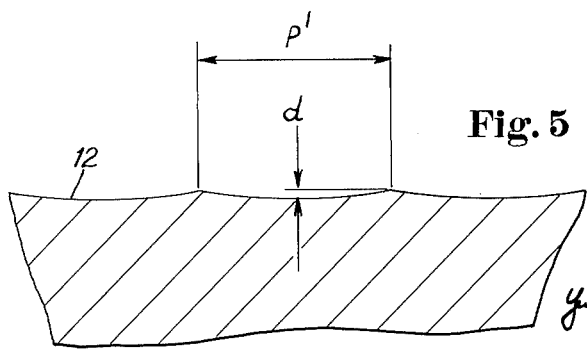
FIGURE 5 is a fragmentary view showing the profile of the sealing surfaces on a greatly enlarged scale.

Referring now to FIGURE 5, there is shown an exaggerated profile view of the surfaces 12. This surface will be referred to hereinafter as having a scalloped profile, or as being a scalloped surface. In practice, this surface is generated by turning the surface with a round-nosed turning tool having a radius from .020 inch to .050 inch while feeding the tool axially at a rate of between .010 inch and .025 inch per revolution, thereby producing what might be termed circumferentially extending pockets or a phonograph finish.

The surface thus produced will appear fairly smooth to the unaided eye but it actually presents a scalloped profile as seen in FIGURE 5. Preferably the dimension p' will be between .010 inch and .025 inch, and the depth d will be between .0003 inch and .0015 inch. The radius of curvature of the scallops will preferably be from about .020 inch to about .050 inch.

It will now be understood that the scalloped surface is really a thread of a short pitch in relation to the pitch of the threads 13. Thus during each make-up of the joint the so-called threads of the scalloped surface are in fact cross-threaded and form a series of minute pockets which trap thread compound to produce a perfect seal and to prevent galling each time the joint is disassembled.

With regard to the pulling flank angle or back flank angle it has been pointed out above that there is usually provided a negative angle. Preferably for relatively small sized tubing, from say about 2 inch diameter through about 3½ inch outside diameter, the angle Z in FIGURES 1 and 2 should be between about 3° and about 5°. With larger sizes of tubing above 3½ inch outside diameter this negative angle may be gradually increased to about 18° as a maximum, for tubing having a diameter of about 13⅜ inches. Preferably the back flank angle on the female member is a few degrees larger than the back flank angle of the male member, to insure contact at the root of the thread of the male member, and thereby enable the threads to sustain a greater load. Thus with normal tolerances required in tool manufacture and discrepancies in machining, this difference in negative back flank angle between the threads on the male and female members makes certain that the pulling flank on the female member engages the pulling flank of the male member at the bottom of the male thread, so that even the smallest imperfect thread is engaged in spite of maximum variation of thread flank angle which is inherent in thread cutting techniques.

It will be understood that numerous modifications may be made without departing from the spirit of the invention. For example, where large diameter tubing is used as surface casing, i.e., used at the top of the string to keep out surface water and prevent cave-in, it is often in compression rather than in tension and a much smaller front flank angle has been found desirable to prevent collapse or jump-out of the joint. In such applications the front flank angle X may be as little as 15° with 18° having been found particularly suitable for 13⅜ inch tubing. Where such tubing is used as surface casing and is in compression, the negative back flank angle is not required to perform its usual function of withstanding tensile loads, although it is preferably maintained.

We have thus described the invention in certain exemplary embodiments, with the understanding that it is not intended that the invention be limited excepting in the manner set forth in the claims which follow.

The embodiments of the invention in which an exclusive property or privilege is claimed are defined as follows:

1. A joint for metallic tubular elements embodying male and female members having engageable threads of relatively long pitch disposed on a relatively steep taper, with the threads having load bearing and non-load bearing flanks, the load bearing flanks having a negative flank angle, and the non-load bearing flanks having a positive flank angle from about 30° to about 60°, the said female member having full threads, and said male member having vanishing threads, said threads on said male member, when said joint is made up, being engaged throughout their length, and said male and female members having complementary tapered sealing surfaces axially displaced and radially offset from said threads so as to make full conical surface contact throughout substantially their over-lapped length, with only surface deformation of the complementary sealing surfaces; one, at least, of said complementary sealing surfaces being contoured to present a scalloped profile, said scalloped profile being constituted by circumferentially extending pockets, and the tapered sealing surface on said female member terminating in an internal shoulder spaced from the end of the tapered sealing surface of the male member when said joint is fully made up and tonged, whereby upon each new make up and disassembly of said joint, fresh increments of complementary sealing surfaces come into engagement.

2. A joint for tubular elements according to claim 1, wherein said negative flank angle is from about 3° to 18°.

3. A joint for metallic tubular elements embodying male and female members having engageable threads of relatively long pitch disposed on a relatively steep taper, with the threads having load bearing and non-load bearing flanks, the load bearing flanks having a negative flank angle, and the non-load bearing flanks having a positive flank angle from about 30° to about 60°, the said female member having full threads, and said male member having vanishing threads, said threads on said male member, when said joint is made up, being engaged throughout their length, and said male and female members having complementary tapered sealing surfaces axially displaced and radially offset from said threads so as to make full conical surface contact throughout substantially their over-lapped length with only surface deformation of the complementary sealing surfaces; one, at least, of said complementary sealing surfaces being contoured to present a scalloped profile, said scalloped profile being constituted by a relatively shallow and wide thread of relatively short pitch, and the tapered sealing surface on said female member terminating in an internal shoulder spaced from the end of the tapered sealing surface of the male member when said joint is fully made up and tonged, whereby on make up of said joint, said scalloped threads are, in effect, mashed, forming minute pockets to trap thread compound, thereby sealing the joint while preventing galling, and whereby upon each new make up and disassembly of said joint, fresh increments of complementary sealing surfaces come into engagement.

4. A joint for tubular elements according to claim 3, wherein both of said complementary sealing surfaces present said scalloped profile.

5. A joint for metallic tubular elements embodying male and female members having engageable threads of relatively long pitch disposed on a relatively steep taper, the said female member having full threads, and said male member having vanishing threads, said threads on said male member, when said joint is made up, being engaged throughout their length, and said male and female members having complementary tapered sealing surfaces axially displaced and radially offset from said threads so as to make full conical surface contact throughout substantially their over-lapped length with only surface deformation of the complementary sealing surfaces; one, at least, of said complementary sealing surfaces being contoured to present a scalloped profile, said scalloped profile being constituted by a relatively shallow and wide thread of relatively short pitch, and the tapered sealing surface on said female member terminating in an internal shoulder spaced from the end of the tapered sealing surface of the male member when said joint is fully made up and tonged, whereby on make up of said joint, said scalloped threads are, in effect, mashed, forming minute pockets to trap thread compound, thereby sealing the joint while preventing galling, and whereby upon each new make up and disassembly of said joint, fresh increments of complementary sealing surfaces come into engagement.

6. The joint for tubular elements according to claim 5, wherein the threads of the male and female members have a positive front flank angle of from about 15° to about 60°, and a negative back flank angle of from about 3° to about 18°.

References Cited by the Examiner

UNITED STATES PATENTS

| | | | |
|---|---|---|---|
| 787,154 | 4/1905 | Delehant | 285—332 |
| 1,919,734 | 7/1933 | Kyle | 285—332 X |
| 2,062,407 | 12/1936 | Eaton | 285—334 |
| 2,207,005 | 7/1940 | Haas | 85—46 |
| 2,450,453 | 10/1948 | Boehm | 285—334 X |
| 2,518,468 | 8/1950 | Harding | 151—19 X |
| 2,671,949 | 3/1954 | Welton | 285—334 X |
| 2,893,759 | 7/1959 | Blose | 285—334 |
| 2,967,068 | 1/1961 | Gressel | 285—328 |
| 3,041,088 | 6/1962 | Brandon | 285—355 X |
| 3,109,672 | 11/1963 | Franz | 285—334 |

CARL W. TOMLIN, *Primary Examiner.*